United States Patent [19]

Hutchison

[11] 4,078,117
[45] Mar. 7, 1978

[54] CONCRETE CURING COMPOSITION

[75] Inventor: Charles Bryce Hutchison, El Dorado, Ark.

[73] Assignee: Lion Oil Company, El Dorado, Ark.

[21] Appl. No.: 631,670

[22] Filed: Nov. 13, 1975

[51] Int. Cl.$^2$ .................. B32B 11/04; C08L 95/00
[52] U.S. Cl. ................................ 428/446; 138/146; 106/277; 106/278; 427/138; 427/230; 427/385 C; 427/372 R; 427/384; 428/36; 428/450; 428/489; 428/308
[58] Field of Search .............. 428/446, 489, 308, 36, 428/450; 106/285, 278, 277; 427/138, 230, 385 C, 372 R, 384; 138/146

[56] References Cited

U.S. PATENT DOCUMENTS

| 1,767,533 | 6/1930 | Kirschbraun | 428/446 |
| 1,943,085 | 1/1934 | Müller | 428/489 |
| 2,068,995 | 1/1937 | Rodwell | 428/489 |
| 2,450,756 | 10/1948 | Hoiberg | 428/446 |
| 2,481,370 | 9/1949 | van den Berge | 428/489 |
| 3,762,975 | 10/1973 | Iwasaki | 428/446 |

Primary Examiner—Ellis Robinson

[57] ABSTRACT

Disclosed are: (1) A composition comprising a major amount of catalytically air-blown asphalt and minor amounts of plasticizer and solvent for the asphalt; (2) a method for curing uncured concrete comprising coating the uncured concrete with the composition set forth above, then curing both the concrete with the composition; and (3) cured concrete coated with a composition comprising a major amount of catalytically air-blown asphalt and a minor amount of plasticizer.

12 Claims, No Drawings

CONCRETE CURING COMPOSITION

This invention relates to the use of asphalt-containing compositions as coatings for uncured concrete. These coatings increase concrete strength by retarding the drying and curing time, and, upon curing, form strong, void-free, ductile, non-toxic concrete coatings.

In the manufacture of metal pipe to be used for carrying potable water from reservoirs or other sources to consumers, the American Water Works Association and the American National Standards Institute require pipe linings that are non-toxic, as determined by the Institute's ANSI-A21.4-1974 test (ANSI Test). Pipe manufacturers have commonly applied concrete coatings to the inner pipe wall to protect the wall from corrosion. Because water passing through such pipe tends to erode the concrete lining, pipe manufacturers commonly apply a coating over the concrete that resists erosion, and itself passes the ANSI Test. Such coatings must be sufficiently viscous that they do not flow when applied to uncured concrete, must cure to a continuous, void-free finish, must be sufficiently ductile after curing to resist disbonding under normal stresses applied to the pipe, and must be substantially non-toxic under the ANSI Test. Until now, no such coating has been found that meets these needs.

This invention provides a composition especially useful as a cure coating for uncured concrete comprising a major amount of at least one catalytically air-blown asphalt having a penetration at 77° F. measured by ASTM D5-73 of about 21 to about 26 tenths of millimeters (mm/10), a (Ring & Ball) softening point in the range of about 195° to about 205° F., measured by ASTM D36-70, and minor amounts of at least one plasticizer and at least one solvent for the catalytically air-blown asphalt. Some of these compositions are not new. However, no such composition has previously been used as a coating for uncured concrete. Moreover, compositions of this general kind wherein the solvent for the asphalt has an initial boiling point (IBP) of not more than about 250° F., or an end boiling point (EBP) of more than 360° F. but not more than about 450° F. are new compositions of matter.

The source of the asphalt which is catalytically air-blown for the present composition is not critical, but the asphalt must be one that can be catalytically air-blown. See U.S. Pat. No. 2,450,756 for details of this process. A useful asphalt for this purpose may be obtained by steam and vacuum reducing an asphaltic base crude oil to an asphaltic residue having a penetration at 77° F. (ASTM D5-73) of from about 25 to about 225 mm/10. This range may vary depending upon the crude source. However obtained, the asphalt is catalytically air-blown in the presence of a phosphorus-containing catalyst selected from the group consisting of the stable acids of phosphorus, such as orthophosphoric acid and pyrophosphoric acid, phosphorous pentoxide, red phosphorus, the stable sulfides of phosphorus, such as phosphorus sesquisulfide, phosphorus sulfide and phosphorus pentasulfide, and phosphorus anhydrides such as phospholeum. Air blowing is carried out at an elevated temperature, preferably within the range of about 400° to about 550° F. for the time required to effect the desired changes in physical properties which may vary from about 10 minutes to about 5-8 hours depending upon the characteristics of the base asphalt. The asphalts produced by the air-blowing technique are characterized by higher than normal penetration values and higher elongation without rupture than unblown asphalts that have the same softening point. Thus, in the examples below, the unblown asphalt had a penetration at 77° F. of from about 85 to about 100 and a softening point of from about 115° to about 120° F.

Broadly, catalytically air-blown asphalt constitutes a major amount by weight of the compositions of this invention. More specifically, the asphalt is about 55 to about 65, preferably about 58 to about 62, percent by weight of these compositions.

Plasticizer and solvent are added to the composition of this invention in minor amounts sufficient to produce a composition viscosity in the range of about 200 to about 400 Saybolt Furol Seconds (SFS) at 100° F. as measured by ASTM D88-56. Cured, this composition has a toxicity level of not more than 18 mg. per square inch of surface exposed of chloroformsoluble extractives, corrected for zinc extractives such as zinc oleate, under the ANSI Test and a ductility of from about 5 to about 12, preferably about 7 to about 11, cm under ASTM D113-69.

Useful plasticizers are those rated substantially non-toxic under the ANSI Test, Sec. 4-14, and inert, in combination with catalytically air-blown asphalt and solvent therefor. Preferably, the plasticizer is an oil having a viscosity of about 180 to about 220 Saybolt Universal Seconds (SUS), preferably about 195 to about 205 SUS, as measured by ASTM D88-56. Generally, the plasticizer is present in amounts of about 1 to about 3, preferably about 1.5 to about 2.5, percent by weight of the composition.

Useful solvents must be good solvents for asphalt and must be substantially non-toxic in these compositions in the ANSI Test. Substantially non-aromatic petroleum solvents having an IBP of about 200° to about 325° F., and an EBP of not more than about 650° F. are such solvents. Petroleum naphtha is preferred, particularly petroleum naphtha having an IBP of about 300° F., and an EBP of not more than about 360° F. Compositions containing substantially nonaromatic, and preferably substantially hydrocarbonaceous solvents having an IBP of not more than about 250° F., or an EBP of more than 360° F. but less than about 450° F., preferably less than about 400° F., are also preferred, and are new compositions of matter. Generally, solvent constitutes about 30% to about 50%, preferably about 35% to about 38%, by weight of the composition.

The compositions of the invention may be made in any convenient manner. For example, one or more catalytically air-blown asphalts, prepared as described in U.S. Pat. No. 2,450,756, may be blended with one or more plasticizers at a temperature above the softening points of the asphalts, and the resulting blend then dissolved in a suitable solvent or mixture of two or more different solvents.

The compositions of this invention are useful for curing uncured concrete. The compositions are applied as a coating to the surface of the uncured concrete by spraying or other conventional techniques, and the coated, uncured concrete and the coating of the invention are cured. In practice, thicknesses of about 5 to about 30, preferably about 10 to about 20, mils of the composition of this invention are applied to the surface of the uncured concrete. Upon curing, the concrete is stronger than concrete which cures without such a coating because the coating slows the concrete curing process. The slower the cure, the stronger the cured concrete. The coating of the invention flows uniformly when applied, and is sufficiently coherent that few voids form in its surface. As applied, the coating is sufficiently thick to substantially inhibit blistering. Upon curing, the coating composition forms an even, continuous film that is substantially non-toxic under the ANSI Test. The cured coating has good ductility, ranging from about 7 to about 12 cm. in the ASTM ductility test D113-69, and is typically at least 10 cm.

EXAMPLES

Smackover crude oil from the Smackover Field, Ark., was reduced in a steam and vacuum distillation unit to a penetration at 77° F. of about 85 to about 100, and a softening point of about 115° to about 120° F. This asphalt was then catalytically air-blown at 440°–460° F. in the presence of 1.3% by weight of phospholeum to a penetration of about 21 to about 26 at 77° F., and a softening point of about 195° to about 205° F. Maintaining the asphalt at about 450° F., about 3.2 percent by weight of 200 (SUS) neutral oil, a plasticizer for the asphalt, was added thereto. The resulting asphalt/plasticizer blend was then added to a non-aromatic petroleum naphtha solvent to form a solution containing 58 to 65 percent asphalt/plasticizer by weight of the total composition. Two such compositions were prepared, one with a solvent having a IBP of about 240° and an EBP of about 315° F. (Table 1, composition A), and the second with a petroleum naphtha having an IBP of about 300° F. and an EBP of about 360° F. Composition A is an example of the new compositions of this invention.

Each of A and B was applied to uncured concrete, cured, and subjected to the ANSI Test which briefly consists of chloroform extraction of the cured asphalt coating to determine the concentration of extractables corrected for zinc extractives such as zinc oleate. Neither coating yielded more than 18 mg. of extractables per square inch of cured coating surface exposed. Thus both A and B passed the ANSI Test.

TABLE I

| Properties of Coatings | A | B |
|---|---|---|
| Base Asphalt | | |
| Softening Point, ° F. | 197 | 200 |
| Penetration at 77° F. | 21 | 24 |
| Base Asphalt with Neutral Oil | | |
| Softening Point, ° F. | 190 | 190 |
| Penetration at 77° F. | 30 | 33 |
| Solvent | | |
| Boiling Range ° F. | 240/315 | 300/360 |
| Cutback | | |
| Viscosity, SFS | | |
| at 77° F. | — | |
| at 100° F. | 240 | 200/350 |
| Solids, Percent (%) by wt. | 61.2 | 63.0 |
| Pounds per gallon, 60° F. | 7.47 | 7.60 |
| Flash Point, ° F.[(1)] | 80+ | 100+ |
| Distillation | | |
| over at 374° F. | 40.0 | 20.0 |
| 437° F. | 43.5 | 38.0 |
| 500° F. | 45.0 | 42.0 |
| 600° F. | 47.0 | 46.0 |
| 680° F. | 47.5 | 47.0 |
| Residue | | |
| Softening Point, ° F. | 170 | 171 |
| Penetration at 77° F. | 38 | 41 |
| Ductility at 77° F. | 10 | 11 |

[(1)]Using Pensky Martens Closed Tester

What is claimed is:

1. A method for producing a cured concrete having a non-toxic, continuous, void-free and erosion resistant coating thereon which comprises coating uncured concrete with a composition in an erosion preventive effective amount, said composition comprising a major amount of at least one catalytically air-blown asphalt having a penetration at 77° F. of about 21 to 26 in tenths of millimeters and as measured by ASTM D5-73 and a softening point of about 195° to about 205° F., and sufficient minor amounts of at least one plasticizer and at least one solvent for the catalytically air-blown asphalt to produce a cured coating having a ductility of about 5 to 12 cm., and toxicity level of less than 18 mg/sq. inch of surface exposed under the ANSI Test.

2. The method of claim 1 wherein the plasticizer is oil having a viscosity about 180 to about 220 SUS at 100° F., and the solvent is a hydrocarbon having an IBP of at least about 200° F., and an EBP of not more than about 650° F.

3. The method of claim 2 wherein the composition comprises about 55% to about 65% by weight of catalytically air-blown asphalt, about 1% to about 3% by weight of plasticizer, and about 30% to about 50% by weight of solvent.

4. The method of claim 3 wherein the plasticizing oil has a viscosity of 200 SUS at 100° F., and the solvent is petroleum naphtha.

5. A composition comprising a major amount of at least one catalytically air-blown asphalt having a penetration at 77° F. of about 21 to 26 in tenths of millimeters and as measured by ASTM D5-73 and a softening point of from about 195° to 205° F. and from about 1% to 3% by weight of a plasticizer and at least one solvent for said asphalt, said solvent having an IBP of not more than about 250° F. or an EBP of more than about 360° F. but not more than about 450° F.

6. The composition of claim 5 wherein the plasticizer is oil having a viscosity of about 180 to about 220 SUS at 100° F., and the solvent is petroleum naphtha.

7. The composition of claim 6 wherein the composition comprises about 55% to about 65% by weight of said asphalt, about 1% to about 3% by weight of plasticizer, and about 30% to about 50% by weight solvent.

8. Cured concrete coated with an erosion preventive effective amount of a composition comprising a major amount of at least one catalytically air-blown asphalt having a penetration at 77° F. of about 21 to 26 in tenths of millimeters and as measured by ASTM D5-73 and a softening point of about 195° to about 205° F., and a sufficient minor amount of at least one plasticizer for said catalytically air-blown asphalt to produce a cured coating having a ductility of about 5 to 12 cm., said cured coating having a toxicity level of less than 18 milligrams per square inch of coated surface exposed under the ANSI Test.

9. A method, according to claim 1, wherein the catalytically air-blown asphalt and plasticizer are in solution in a substantially non-aromatic petroleum solvent therefor.

10. A composition, according to claim 5, wherein the asphalt and plasticizer are in solution in a substantially non-aromatic petroleum solvent therefor.

11. A method for preventing erosion of concrete linings of pipes for conveying potable water by providing a non-toxic, continuous, substantially void-free and erosion resistant coating on said concrete lining which comprises coating the uncured concrete lining with a liquid solution having a viscosity in the range of about 200 to about 400 Saybolt Furol Seconds at 100° F., the amount of said liquid composition coated on said concrete being sufficient to prevent erosion and inhibit blistering, said liquid composition consisting essentially of a major amount of at least one catalytically air-blown asphalt having a penetration at 77° F. of about 21 to 26 in tenths of millimeters and as measured by ASTM D5-73 and a softening point of about 195° to about 205° F. and a minor amount of a plasticizer, both the catalytically air-blown asphalt and plasticizer being dissolved in a solvent therefor, the amount of plasticizer and solvent being sufficient to produce a cured coating having a ductility of about 5 to 12 cm., and a toxicity level of less than 18 mg/sq. inch of surface exposed under the ANSI Test.

12. A method, according to claim 11, wherein the solvent is a substantially non-aromatic petroleum solvent.

* * * * *